(12) United States Patent  
Lewites

(10) Patent No.: US 7,631,178 B2  
(45) Date of Patent: Dec. 8, 2009

(54) INDEPENDENT MAIN PARTITION RESET

(75) Inventor: Saul Lewites, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 11/395,465

(22) Filed: Mar. 30, 2006

(65) Prior Publication Data

US 2007/0234026 A1 Oct. 4, 2007

(51) Int. Cl.
G06F 1/24 (2006.01)
G06F 9/00 (2006.01)
G06F 15/177 (2006.01)
G06F 3/00 (2006.01)
G06F 12/00 (2006.01)
G06F 11/00 (2006.01)

(52) U.S. Cl. ............... 713/100; 713/1; 713/2; 710/8; 710/15; 711/166; 711/173; 714/5

(58) Field of Classification Search ............. 713/100, 713/1, 2; 710/8, 15; 711/166, 173; 714/5
See application file for complete search history.

(56) References Cited

U.S. PATENT DOCUMENTS

| 5,717,942 | A  * | 2/1998  | Haupt et al. ............... 712/13 |
| 7,089,413 | B2 * | 8/2006  | Erickson et al. ............ 713/2 |
| 7,117,385 | B2 * | 10/2006 | Chokshi et al. ............. 714/5 |
| 7,146,515 | B2 * | 12/2006 | Harrington et al. ......... 713/324 |
| 7,353,375 | B2 * | 4/2008  | Cepulis ..................... 713/1 |
| 2004/0210890 | A1 * | 10/2004 | Armstrong et al. ......... 717/168 |
| 2005/0108456 | A1 * | 5/2005  | Boutcher et al. ............ 710/240 |

* cited by examiner

*Primary Examiner*—Chun Cao  
*Assistant Examiner*—Stefan Stoynov  
(74) *Attorney, Agent, or Firm*—Blakely, Sokoloff, Taylor & Zafman LLP

(57) ABSTRACT

An embodiment of the present invention is a technique to provide independent reset of a main partition. A reset functionality is disabled to preclude a main partition from resetting a platform. The platform has a visible resource belonging exclusively to the main partition. An activity of the main partition is monitored to determine if the main partition is about to reset the platform or becomes inoperable. The main partition is restricted to initialize the visible resource.

26 Claims, 5 Drawing Sheets

INDEPENDENT MAIN PARTITION RESET

FIELD OF THE INVENTION

Embodiments of the invention relate to the field of microprocessor systems, and more specifically, to platform partitioning.

DESCRIPTION OF RELATED ART

Platform partitioning is a process to create multiple partitions on a platform that may correspond to different operating systems (OSs) or the same OS. Each partition may include a number of units such as input/output (I/O) devices and memories. It is possible to hide a partition from the OS or the main OS by programming configuration parameters in a table of a configuration interface or an input/output (I/O) controller. The result is a creation of multiple execution environments. One execution environment is which the OS or the main OS runs is referred to as the main partition. The other execution environment(s) may not be visible to the OS or the main OS, known as sequestered partition(s). The sequestered partition(s) may be used for a variety of applications, such as I/O off-loading, platform manageability, and fault prediction.

In a platform having a sequestered partition, when the main partition is reset or reinitialized, the operations of the sequestered partition may be affected. This may lead to undesirable consequences on applications that are using resources managed by the sequestered partition(s).

BRIEF DESCRIPTION OF THE DRAWINGS

Embodiments of invention may best be understood by referring to the following description and accompanying drawings that are used to illustrate embodiments of the invention. In the drawings.

DESCRIPTION

An embodiment of the present invention is a technique to provide independent reset of a main partition. A reset functionality is disabled to preclude a main partition from resetting a platform. The platform has a visible resource belonging exclusively to the main partition. An activity of the main partition is monitored to determine if the main partition is about to reset the platform or becomes inoperable. The main partition is restricted to initialize the visible resource.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention is a technique to provide independent main partition reset without affecting the sequestered partition(s). A main partition performs a pre-reset activity before performing a reset. By monitoring this pre-reset activity, a sequestered partition knows when the main partition is about to reset. When this occurs, the sequestered partition generates or sends a non-maskable interrupt to a processor running the main partition. The non-maskable interrupt directs the processor to jump to a code patch in a basic input/output system (BIOS). The code patch contains instructions or functions that identify the executing processor as the processor running the main partition. The code patch contains instructions to allow initialization of visible resources, e.g., resources that are visible, or belong to, exclusively the main partition. Therefore, the main partition is prevented from resetting or initializing the sequestered resources.

Figure 1:
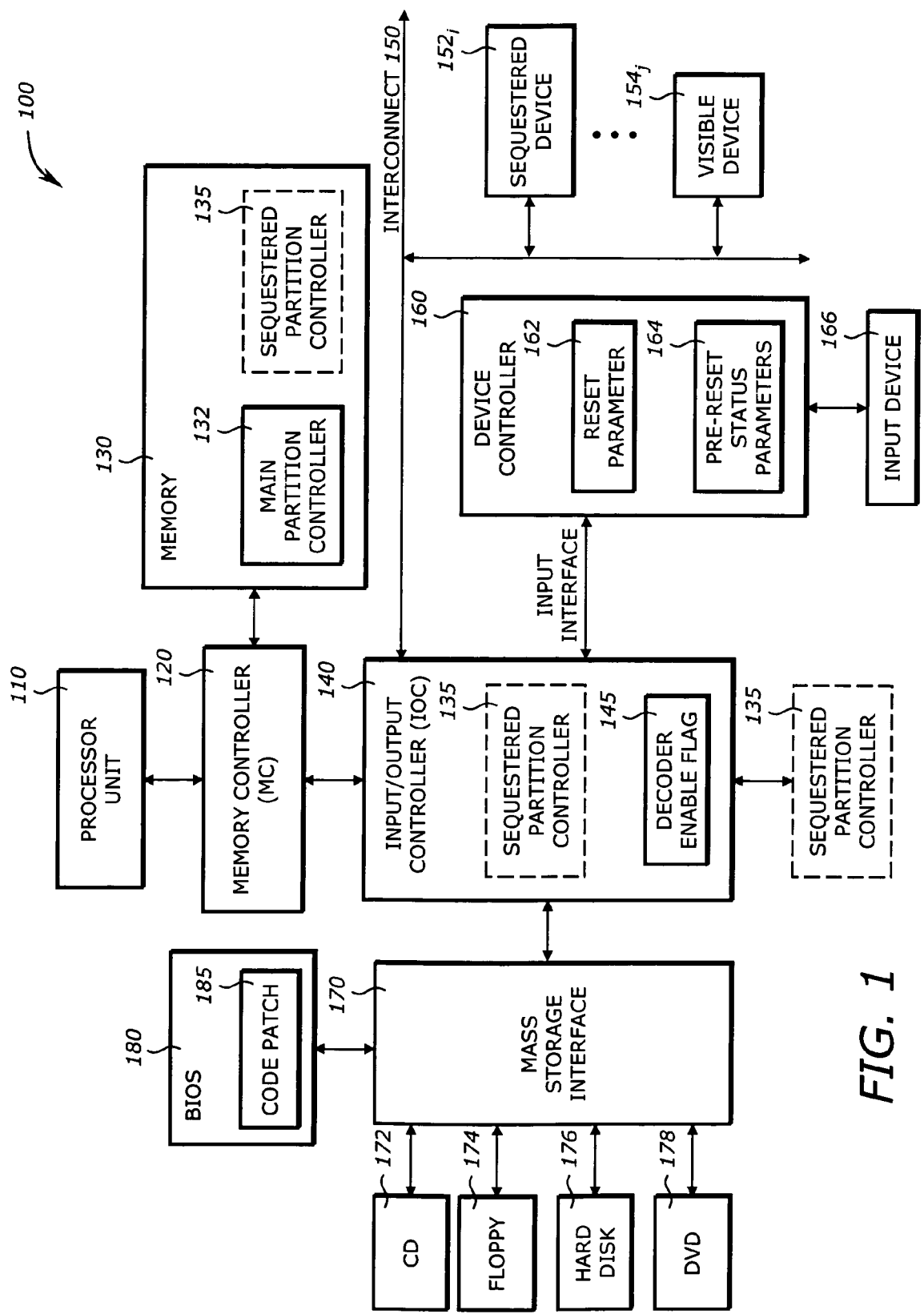
FIG. 1 is a diagram illustrating a system in which one embodiment of the invention can be practiced.

FIG. 1 is a diagram illustrating a system 100 in which one embodiment of the invention can be practiced. The system 100 represents a platform. It may include a processor unit 110, a memory controller (MC) 120, a main memory 130, a sequestered partition controller 135, an input/output controller (IOC) 140, an interconnect 150, a sequestered device $152_i$, a visible device $154_j$, a device controller 160, and a mass storage interface 170.

The processor unit 110 may include one or more processors. It may represent a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. When the processor unit 110 has. multiple processors, physical or logical, a processor may be sequestered, or hidden from the main partition. Similarly, a core in a multi-core processor, or a thread in a multi-thread environment may be sequestered from the main partition. The processor unit 110, therefore, may include a visible or sequestered core, processor, or thread.

The MC 120 provides control and configuration of memory and input/output devices such as the main memory 130 and the IOC 140. The MC 120 may be integrated into a chipset that integrates multiple functionalities such as graphics, media, host-to-peripheral bus interface, memory control, power management, etc. The MC 120 or the memory controller functionality in the MC 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 130 is typically implemented with dynamic random access memory (DRAM), static random access memory (SRAM), or any other types of memories including those that do not need to be refreshed. The main memory 130 may include a main partition controller 132 and a sequestered partition controller 135. The main partition controller 132 contains programs or instructions that operate to support the main partition. The sequestered partition controller 135 contains a program or instructions to perform sequestered partition control functions. It may be implemented by software, hardware or firmware, or any combination thereof. The sequestered partition controller 135 may reside partly or fully inside and/or outside the memory 130. FIG. 1 shows the sequestered partition controller 135 in dotted lines at several places to illustrate that it may be located anywhere on the platform and may be implemented by software, hardware or firmware, or any combination thereof. The main memory 130 may also include visible or sequestered portions.

The IOC 140 has a number of functionalities that are designed to support I/O functions. The IOC 140 may also be integrated into a chipset together or separate from the MC 120 to perform I/O functions. The IOC 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, etc. The IOC may be a chipset controller. The IOC may contain partly or fully the sequestered partition controller 135 and a decoder enable flag 145. The decoder enable flag 145, when asserted, enables decoding the I/O location of a reset parameter 162 in the device controller 160 as part of the reset functionality of the main partition. When it is disabled, the decoding of the I/O location is inhibited and the main partition is precluded from resetting the platform.

The interconnect 150 provides interface to peripheral devices. The interconnect 150 may be point-to-point or connected to multiple devices. For clarity, not all interconnects are shown. It is contemplated that the interconnect 150 may include any interconnect or bus such as Peripheral Component Interconnect (PCI), PCI Express, Universal Serial Bus (USB), and Direct Media Interface (DMI), etc. There may be additional interconnects in the system or platform.

The sequestered and visible devices $152_i$ (i=1, ..., K) and $152_j$ (j=1, ..., L), where K and L are any integers, may include any I/O devices to perform I/O functions. Examples of I/O devices are a network interface card (NIC), a media card (e.g., audio, video, graphic), etc. The sequestered device $152_i$ is a device that is sequestered or hidden from the main partition. The visible device $152_j$ is a device that is visible or accessible to the main partition. It belongs exclusively to the main partition.

The device controller 160 is a device that controls or interfaces to an input device 166. It interfaces to the IOC 140 via an input/output interface such as a Low Pin Count interface. It includes a reset parameter 162 and a pre-reset status parameter 164. The reset parameter 162 may be a register or an I/O port whose I/O address decoding is control by the decoder enable flag 145 in the IOC 140. In one embodiment, this I/O address is fixed, e.g., 0x64. The pre-reset status parameter 164 is a parameter that may be negated when the main partition is about to reset the platform. The input device 166 may be any input device such as wired or wireless keyboard, mouse, trackball, pointing device, and any other peripheral controllers.

The mass storage interface 170 provides interface to a number of mass storage devices. A mass storage device stores archive information such as code, programs, files, data, and applications. The mass storage device may include a compact disk (CD), a read-only memory (ROM) 172, a floppy drive 174, a hard drive 176, a digital video/versatile disc (DVD) 178, and any other magnetic or optic storage devices. It may also include a basic input/output system (BIOS) firmware 180. The mass storage interface 170 provides a mechanism to read machine-accessible media that contain instructions or programs to perform the functions below. The BIOS firmware 180 is typically contained in a non-volatile memory such as a flash memory. It may contain a code patch 185 that allows the main partition to initialize only its visible resources or devices. The code patch 185 may be a method, a routine, a function, or a block of instructions that allows determination of the identifier of the executing processor of the main partition. The code patch 185 may allow the program to identify the resources that exclusively belong to the main partition and the resources that do not exclusively belong to the main partition The main partition may reset the platform in several ways. One typical technique is to write a pre-determined value (e.g., 0xFE) to the keyboard controller located at a pre-determined location (e.g., 0x64). As a result of this write access, the IOC 140 asserts the reset line that is connected to all the components of the platform. If this occurs, all resources, whether visible or sequestered, are initialized. Accordingly, this type of reset may affect a sequestered partition(s). In many applications, the main partition and the sequestered partition may run under two different operating systems and may operate independently. It is, therefore, desirable to be able to control the reset of the main partition independently so that operations of the sequestered partition(s) may not be affected. One embodiment of the invention allows independent main partition reset by directing the main partition to the code patch 185 in the BIOS 180 to initialize only the visible resources when it is about to reset the platform.

Figure 2:
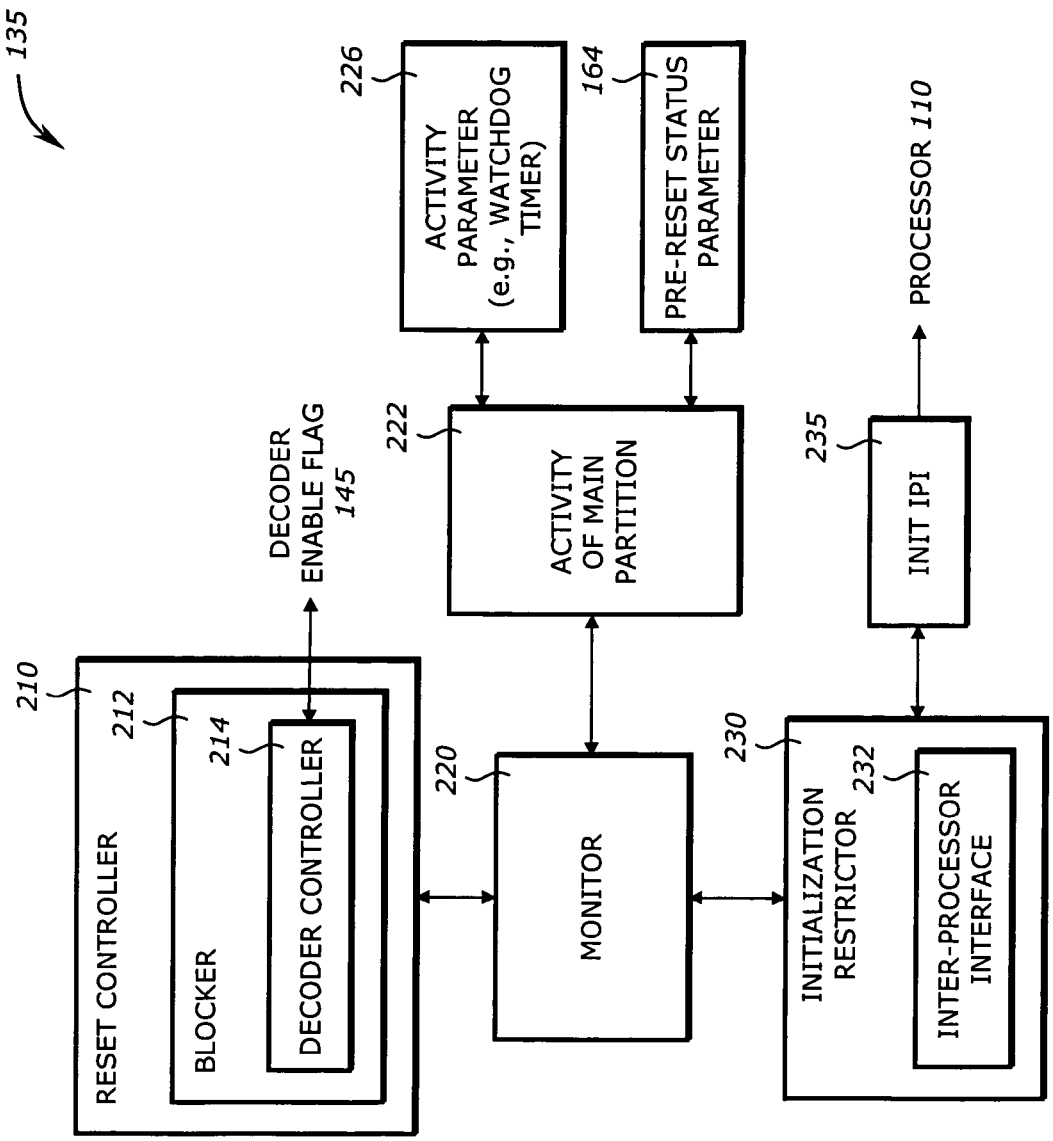
FIG. 2 is a diagram illustrating a sequestered partition controller according to one embodiment of the invention.

FIG. 2 is a diagram illustrating the sequestered partition controller 135 shown in FIG. 1 according to one embodiment of the invention. The sequestered partition controller 135 includes a reset controller 210, a monitor 220, and an initialization restrictor 230. As discussed above, the sequestered partition controller 135 may be implemented by hardware, software, firmware, or any combination thereof. In addition, it may be partly or fully located in the memory 130, the IOC 140, or external to the IOC 140. When implemented by hardware, the components of the sequestered partition controller 135 may be a logic circuit. When implemented by software or firmware, they may represent modules that are coupled together.

The reset controller 210 disables a reset functionality to preclude the main partition 132 from resetting the platform. The platform has at least a visible resource belonging exclusively to the main partition 132. An example of the visible resource is the visible device $154_j$. The reset controller 210 may include a blocker 212. The blocker 212 blocks the main partition from accessing a reset parameter in a device, such as the reset parameter 162 in the device controller 160. The blocker 212 may include a decoder controller 214 to disable decoding an address of the reset parameter in the device. This may be performed by disabling (e.g., negating) the decoder enable flag 145 in the IOC 140.

The monitor 220 monitors an activity 222 of the main partition to determine if the main partition is about to reset the platform or becomes inoperable. Typically, the main partition 132 performs some pre-reset operation before performing a reset operation. For example, the main partition 132 may negate the pre-reset status parameter 164, such as an interrupt enable bit, in the device controller 160. In one embodiment, the device controller 160 is a keyboard controller. Therefore, the monitor 220 may poll the pre-reset status parameter 164 that indicates that the main partition 132 is about to reset the platform. If the pre-reset status parameter 164 is negated, then the monitor 220 knows that the main partition 132 is about to reset the platform, and proceed to response to this condition. The monitor 220 may generate a signal or a notification to the initialization restrictor 230.

The initialization restrictor 230 restricts the main partition 132 to initialize the visible resource. It may include an interprocessor interface 232 that interfaces to the processor unit 110 or any other processor that is running the main partition 132. It may generate an initialization inter-processor interrupt (IPI) (Init IPI) 235 to the processor 110. This interrupt is a non-maskable interrupt. Its function is to direct the main partition to execute the code patch 185 in the BIOS 180. The code patch 185 in the BIOS 180 prevents the main partition 132 from initializing a platform resource not belonging to the main partition. The BIOS 180 may have been loaded earlier, or during the initialization restrictor 230 performs the operation.

Figure 3:
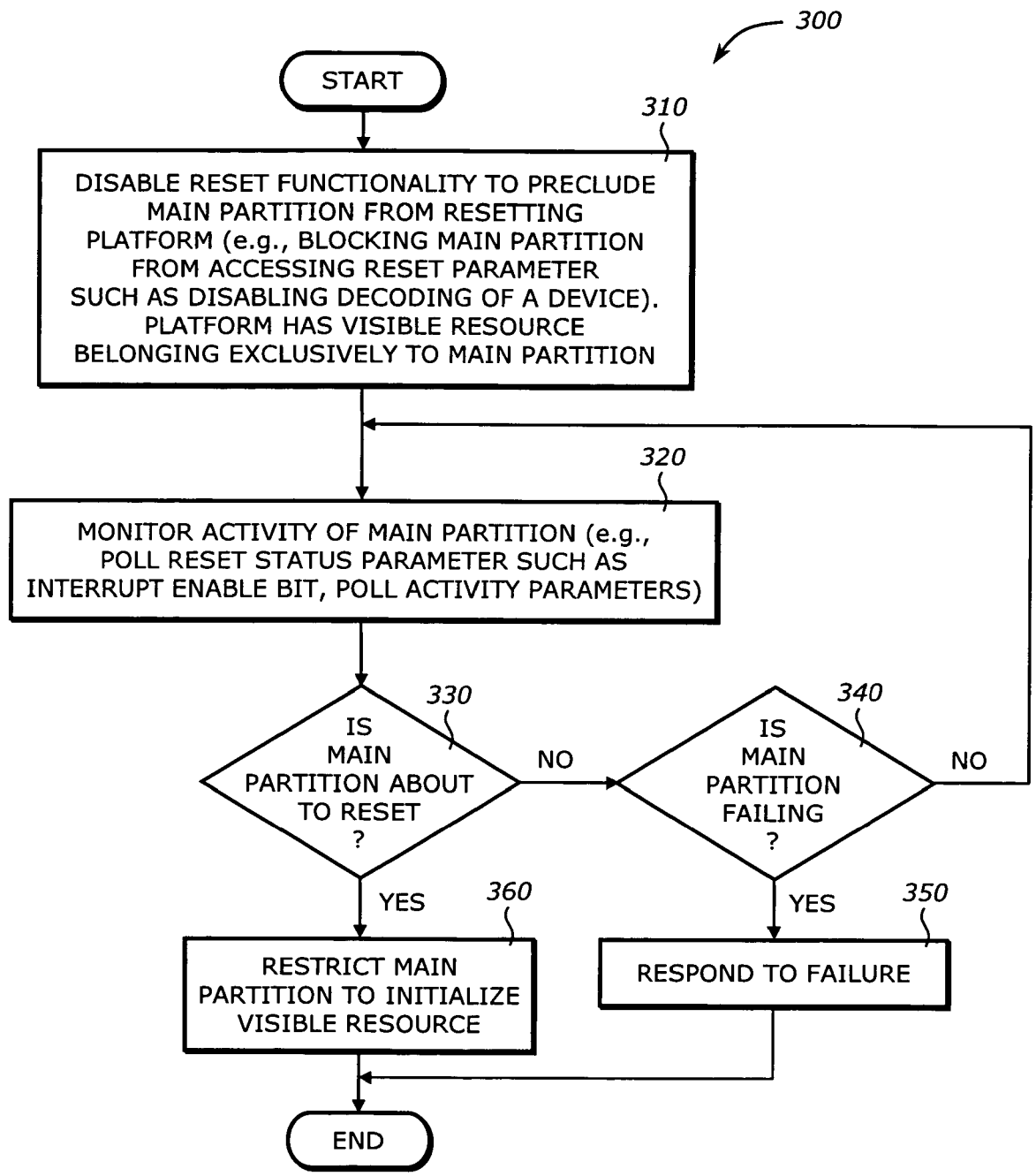
FIG. 3 is a flowchart illustrating a process to control reset according to one embodiment of the invention.

FIG. 3 is a flowchart illustrating a process 300 to control reset according to one embodiment of the invention.

Upon START, the process 300 disables a reset functionality to preclude a main partition from resetting the platform (Block 310). The platform has a visible resource belonging exclusively to the main partition. This can be performed by blocking the main partition from accessing the reset parameter 162 in the device controller 160 (FIG. 1). The blocking may be performed by disabling a decoder enable flag 145 in an IOC 140 (FIG. 1)

Then, the process 300 monitors an activity of the main partition to determine if the main partition is about to reset the platform or becomes inoperable (Block 320). The activity of the main partition may include a normal activity (e.g., normal execution of programs), a pre-reset activity, or a failure. Monitoring the activity may be accomplished by polling a pre-reset status parameter, such as an interrupt enable bit, or polling an activity parameter. Polling here refers to continuously reading the parameter and comparing the read parameter with a known value. The activity parameter is a parameter that may indicate that the main partition has no activity and may be failing. For example, it may be a watchdog timer that generates or asserts a time-out event if certain expected operation is not completed by the main partition. It may be any circuit or function that monitors the operation of the main partition using any technique such as fault tolerant techniques, heartbeat monitoring, etc.

Then, the process 300 determines if the main partition is about to reset the platform (Block 330). If not, the process 300 determines if the main partition is failing (Block 340). If the activity parameter indicates that the main partition is failing, then the process 300 may proceed to respond to the failure (Block 350) and is then terminated. Otherwise, the process 300 returns to Block 320 to continue monitoring the activity of the main partition. If the main partition is about to reset the platform, for example, by negating the pre-reset status parameter, the process 300 restricts the main partition to initialize the visible resource (Block 36)). Since the visible resource belongs only to the main partition, restricting the main partition to initialize or re-initialize the visible resource prevents it from initializing or re-initializing the sequestered resources. Therefore, the main partition may be reset without affecting the sequestered partition. Next, the process 300 is terminated.

Figure 4:
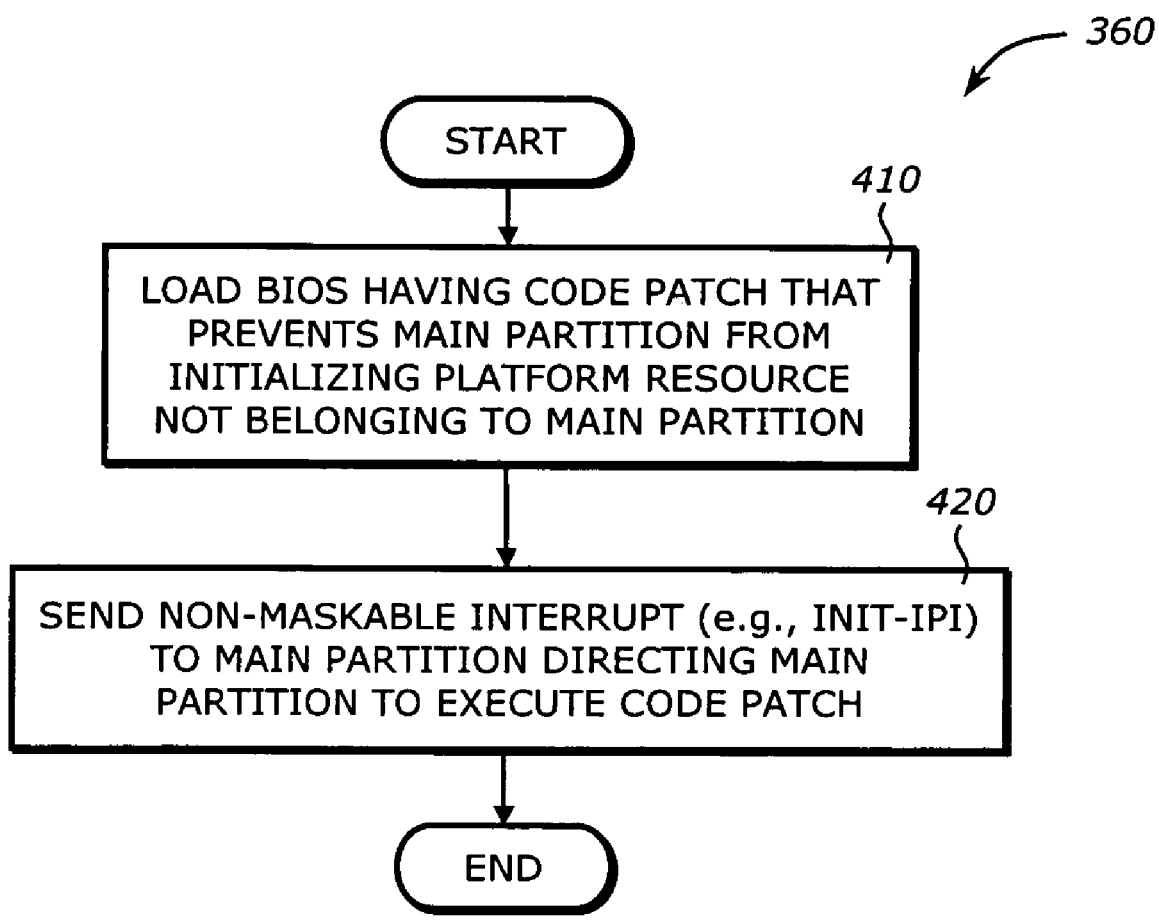
FIG. 4 is a flowchart illustrating a process to restrict main partition according to one embodiment of the invention.

FIG. 4 is a flowchart illustrating a process 360 to restrict main partition according to one embodiment of the invention.

Upon START, the process 360 loads a BIOS having a code patch that prevents the main partition from initializing a platform resource not belonging to the main partition (Block 410). A code patch is a method, a routine, a function, or a block of instructions that allows determination of the identifier of the executing processor of the main partition. The identifier may be a number or an identifier assigned or designated to a logical processor that is responsible for executing the main partition. By knowing which logical processor is executing, the code patch allows the program to identify the resources that exclusively belong to the main partition and the resources that do not exclusively belong to the main partition. Resources that do not belong exclusively to the main partition may include shared resources, or resources that belong to sequestered partition or partitions. Accordingly, only those resources that belong exclusively to the main partition are reset, initialize, or re-initialized. The BIOS loading may take place at the beginning, or at any other phase, not necessarily in this process.

Next, the process 360 sends a non-maskable interrupt to the processor executing the main partition to direct the main partition to execute the code patch in the BIOS (Block 420). The non-maskable interrupt may be in the form of an initialization inter-processor interrupt (IPI) message. Since it non-maskable, it is guaranteed to be serviced, and the response may take place immediately. The receiving processor jumps to the appropriate location of the code patch and execute the code patch as discussed above. The process 360 is then terminated.

Figure 5:
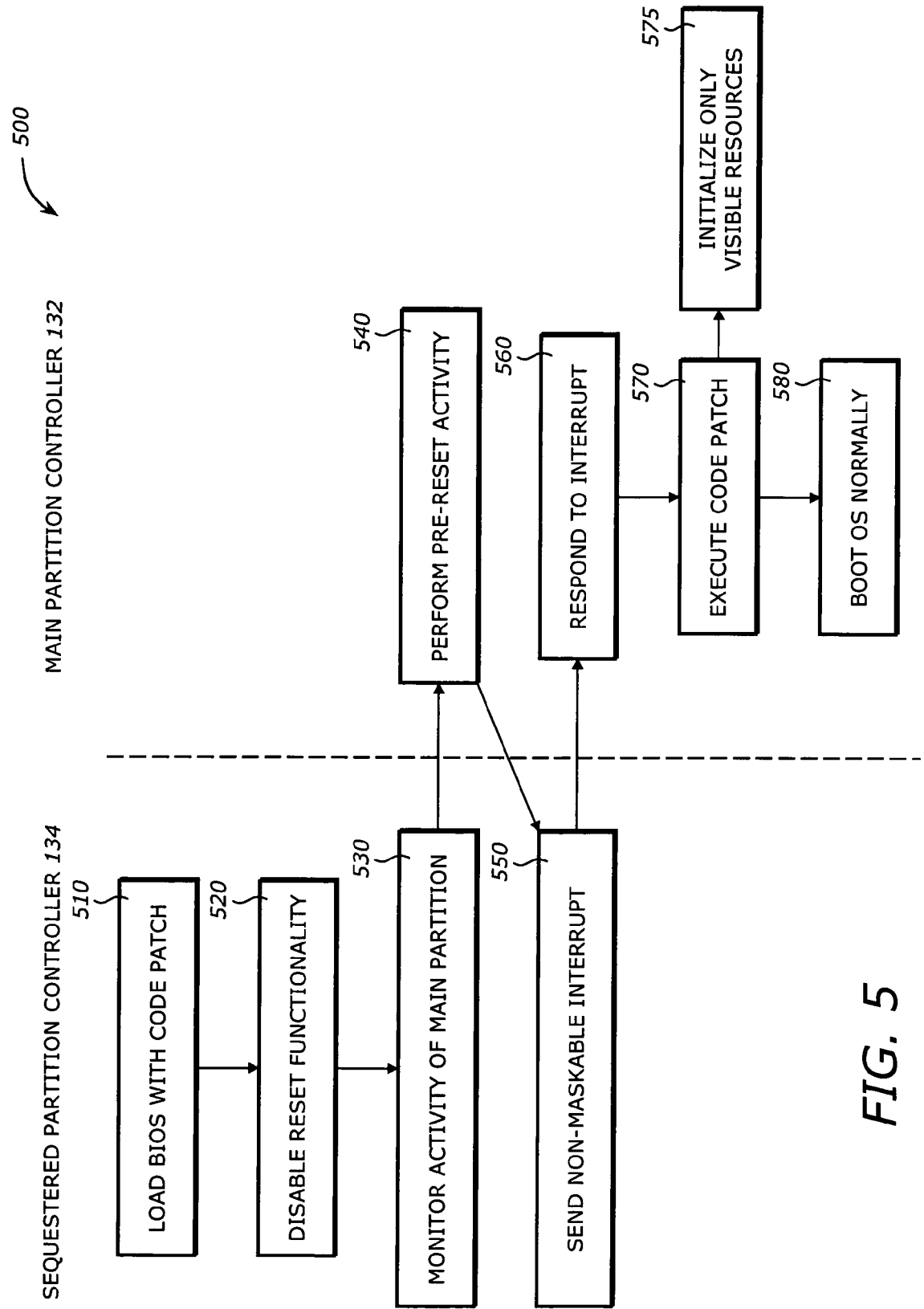
FIG. 5 is a diagram illustrating interactions between sequestered partition and main partition according to one embodiment of the invention.

FIG. 5 is a diagram illustrating interactions 500 between sequestered partition and main partition according to one embodiment of the invention. The interactions 500 show only the operations involved in the control of the reset by the main partition.

The sequestered partition loads the BIOS with a code patch to restrict initialization to only visible resources (Block 510). Then, the sequestered partition disables the reset functionality of the main partition (Block 520). This operation is typically performed early in the process when it is unlikely that the main partition is performing a reset.

Then the sequestered partition monitors the activity of the main partition (Block 530). This may include polling a pre-reset status parameter that may be negated by the main partition. The sequestered partition continues monitoring the main partition's pre-reset activity until such activity is detected. The main partition, before attempting to reset, perform a pre-reset activity, such as negating the pre-reset status parameter (Block 540). Upon detecting this pre-reset activity or operation, the sequestered partition to send a non-maskable interrupt with an appropriate interrupt vector or a pre-determined address information for the code patch in the BIOS (Block 550).

Upon receipt of the non-maskable interrupt, the main partition responds to the interrupt (Block 560). This may include saving context on stack, obtaining interrupt vector or jump address, etc. Then, the main partition executes the code patch (Block 570). This execution only initializes the visible resources that exclusively belong to the main partition, leaving the sequestered resources unaffected (Block 575). Next, the main partition boots the OS normally (Block 580). The booting or reset of the main partition, therefore, may occur without any effect on the sequestered partition.

Elements of embodiments of the invention may be implemented by hardware, firmware, software or any combination thereof. The term hardware generally refers to an element having a physical structure such as electronic, electromagnetic, optical, electro-optical, mechanical, electromechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   disabling a reset functionality to preclude a main partition from resetting a platform, the platform having a visible resource belonging exclusively to the main partition;
   monitoring an activity of the main partition to determine if the main partition performs a pre-reset operation before resetting the platform; and
   restricting the main partition to initialize the visible resource if the main partition performs a pre-reset operation before resetting the platform;
   wherein monitoring comprises: polling a pre-reset status parameter corresponding to the pre-reset operation prior to resetting the platform.

2. The method of claim 1 wherein disabling the reset functionality comprises:
   blocking the main partition from accessing a reset parameter in a device.

3. The method of claim 2 wherein blocking comprises:
   disabling decoding an address of the reset parameter in the device.

4. The method of claim 1 wherein polling the pre-reset status parameter comprises:
   polling an interrupt enable bit in a device.

5. The method of claim 1 wherein monitoring comprises:
   polling an activity parameter that indicates that the main partition is failing.

6. The method of claim 1 wherein restricting comprises:
   loading a basic input/output system (BIOS) having a code patch that prevents the main partition from initializing a platform resource not belonging to the main partition; and
   sending a non-maskable interrupt to the main partition directing the main partition to execute the code patch.

7. The method of claim 6 wherein sending the non-maskable interrupt comprises:
   sending an initialization inter-processor interrupt (Init IPI) to a processor running the main partition.

8. An apparatus comprising:
   a reset controller to disable a reset functionality to preclude a main partition from resetting a platform, the platform having a visible resource belonging exclusively to the main partition;
   a monitor coupled to the reset controller to monitor an activity of the main partition to determine if the main partition performs a pre-reset operation before resetting the platform; and
   an initialization restrictor coupled to the monitor to restrict the main partition to initialize the visible resource if the main partition performs a pre-reset operation before resetting the platform;
   wherein the monitor polls a pre-reset status parameter corresponding to the pre-reset operation prior to resetting the platform.

9. The apparatus of claim 8 wherein the reset controller comprises:
a blocker to block the main partition from accessing a reset parameter in a device.

10. The apparatus of claim 9 wherein the blocker comprises:
a decoder controller to disable decoding an address of the reset parameter in the device.

11. The apparatus of claim 8 wherein the pre-reset status parameter is an interrupt enable bit in a device.

12. The apparatus of claim 8 wherein the monitor polls an activity parameter that indicates that the main partition is failing.

13. The apparatus of claim 8 wherein the initialization restrictor comprises:
an inter-processor interface to send a non-maskable interrupt to the main partition directing the main partition to execute a code patch in a basic input/output system (BIOS), the code patch preventing the main partition from initializing a platform resource not belonging to the main partition.

14. The apparatus of claim 13 wherein the non-maskable interrupt is an initialization inter-processor interrupt (Init IPI) sent to a processor running the main partition.

15. An article of manufacture comprising:
a machine-accessible storage medium including data that, when accessed by a machine, cause the machine to perform operations comprising:
disabling a reset functionality to preclude a main partition from resetting a platform, the platform having a visible resource belonging exclusively to the main partition;
monitoring an activity of the main partition to determine if the main partition performs a pre-reset operation before resetting the platform; and
restricting the main partition to initialize the visible resource if the main partition performs a pre-reset operation before resetting the platform;
wherein the data causing the machine to perform monitoring comprise data that, when accessed by a machine, cause the machine to perform operations comprising:
polling a pre-reset status parameter corresponding to the pre-reset operation prior to resetting the platform.

16. The article of manufacture of claim 15 wherein the data causing the machine to perform disabling the reset functionality comprise data that, when accessed by a machine, cause the machine to perform operations comprising:
blocking the main partition from accessing a reset parameter in a device.

17. The article of manufacture of claim 16 wherein the data causing the machine to perform blocking comprise data that, when accessed by a machine, cause the machine to perform operations comprising:
disabling decoding an address of the reset parameter in the device.

18. The article of manufacture of claim 15 wherein the data causing the machine to perform polling the pre-reset status parameter comprises data that, when accessed by a machine, cause the machine to perform operations comprising:
polling an interrupt enable bit in a device.

19. The article of manufacture of claim 15 wherein the data causing the machine to perform monitoring comprise data that, when accessed by a machine, cause the machine to perform operations comprising:
polling an activity parameter that indicates that the main partition is failing.

20. The article of manufacture of claim 15 wherein the data causing the machine to perform restricting comprise data that, when accessed by a machine, cause the machine to perform operations comprising:
loading a basic input/output system (BIOS) having a code patch that prevents the main partition from initializing a platform resource not belonging to the main partition; and
sending a non-maskable interrupt to the main partition directing the main partition to execute the code patch.

21. The article of manufacture of claim 20 wherein the data causing the machine to perform sending the non-maskable interrupt comprise data that, when accessed by a machine, cause the machine to perform operations comprising:
sending an initialization inter-processor interrupt (Init IPI) to a processor running the main partition.

22. A system comprising:
a chipset controller having a reset functionality; and
a processor coupled to the chipset controller, the processor running an operating system (OS) and supporting a main partition and a sequestered partition in a platform, the platform having a visible resource belonging exclusively to the main partition, the sequestered partition comprising:
a reset controller to disable the reset functionality to preclude a main partition from resetting the platform,
a monitor coupled to the reset controller to monitor an activity of the main partition to determine if the main partition performs a pre-reset operation before resetting the platform, and
an initialization restrictor coupled to the monitor to restrict the main partition to initialize the visible resource if the main partition performs a pre-reset operation before resetting the platform;
wherein the monitor polls a pre-reset status parameter corresponding to the pre-reset operation prior to resetting the platform.

23. The system of claim 22 wherein the reset controller comprises:
a blocker to block the main partition from accessing a reset parameter in a device.

24. The system of claim 23 wherein the blocker comprises:
a decoder controller to disable decoding an address of the reset parameter in the device.

25. The system of claim 22 wherein the pre-reset status parameter is an interrupt enable bit in a device.

26. The system of claim 22 wherein the initialization restrictor comprises:
an inter-processor interface to send a non-maskable interrupt to the main partition directing the main partition to execute a code patch in a basic input/output system (BIOS), the code patch preventing the main partition from initializing a platform resource not belonging to the main partition.

* * * * *